UNITED STATES PATENT OFFICE.

JACOB G. LIPMAN, OF NEW BRUNSWICK, NEW JERSEY.

PHOSPHATE COMPOSITION.

1,361,597. Specification of Letters Patent. Patented Dec. 7, 1920.

No Drawing. Application filed August 26, 1920. Serial No. 406,195.

*To all whom it may concern:*

Be it known that I, JACOB G. LIPMAN, a citizen of the United States of America, residing at New Brunswick, in the county of Middlesex and State of New Jersey, have invented certain new and useful Improvements in Phosphate Composition, of which the following is a full, clear, and exact description.

This invention relates to compositions of matter and has for one of its principal objects to provide a composition of matter consisting of or containing phosphatic material and sulfofying bacteria in a latent or potentially active condition.

Sulfur oxidizing bacteria, which may be referred to as sulfofying bacteria, are the active biological agents in the transformation of elementary sulfur into sulfuric acid. The transformation takes place under suitable environmental conditions where either pure or crude cultures of sulfofying bacteria are employed. In my copending application Serial No. 372,961 filed May 18, 1920, I disclose and claim broadly a composition containing sulfur and latent sulfofying bacteria in a dry condition and specifically a composition containing .5 to 5 parts of latent sulfofying bacteria culture and 95 to 99.5 parts of finely divided sulfur. Among other uses mentioned in said copending application it was pointed out that the compositions claimed therein can be stored almost indefinitely and when applied to soil will become active to produce sulfuric acid and sulfates thereby destroying injurious fungi, etc., and increasing yields.

The composition forming the subject matter of the present application is especially adapted for application to soils already supplied with sulfur but deficient in phosphorus and comprises dry sulfofying bacteria culture and phosphatic material such as phosphate rock. The composition which I find at present most desirable is as follows:

Phosphate rock _____ 95 to 99.5 parts.
Sulfofying bacteria culture_ 5 to 0.5 parts.

Among other methods suitable for preparing the sulfofying bacteria culture (some of which methods are disclosed in my said copending application) the following may be set forth:

A culture of sulfofying bacteria may be obtained by mixing the following constituents in about the following proportions:

Sulfur _____ 100 pounds,
Phosphate rock _____ 300 pounds,
Sulfate of iron _____ 0.4 pound,
Sulfate of aluminum _____ 0.4 pound,
Fertile soil _____ 1600 pounds.

This mixture is preferably kept at a temperature between 70° and 90° Fahrenheit and so moist as to be about one-half saturated. The mixture should be stirred daily or at suitable intervals for from six to ten weeks when the sulfofying bacteria will have developed.

The mixture or culture thus formed is then dried and mixed with ground phosphatic rock (or other suitable phosphatic material) either before, during, or after, but preferably during the grinding of the latter. The preferred proportions of sulfofying bacteria culture and phosphatic material are as stated above 95 to 99.5 parts phosphatic material and 5 to 0.5 parts sulfofying bacteria culture.

The previously dried sulfofying bacteria when intimately mixed with the dry finely divided phosphatic material retain their viability almost indefinitely. The composition is latent or potentially active but may be rendered active at will by suitably changing its environmental or other conditions. For example, when the composition is placed in moist soil, containing sulfur but deficient in phosphorus, the bacteria become active and cause the oxidation of sulfur to sulfuric acid and the phosphatic material supplies the needed phosphorus.

What I claim is:

1. A composition of matter containing phosphatic material and latent sulfofying bacteria in a dry condition.

2. A composition of matter containing dry pulverized phosphatic material and a dry culture of sulfofying bacteria.

3. A composition of matter containing 0.5 to 5 per cent. of latent sulfofying bacteria culture and finely divided phosphate rock.

4. A composition of matter containing 0.5 to 5 parts of latent sulfofying bacteria culture and 95 to 99.5 parts of finely divided phosphate rock.

In testimony whereof I hereto affix my signature.

JACOB G. LIPMAN.